(12) United States Patent
Liu et al.

(10) Patent No.: US 8,640,149 B2
(45) Date of Patent: Jan. 28, 2014

(54) METHOD AND APPARATUS FOR DYNAMIC WEB SERVICE COMPOSITION AND INVOCATION

(75) Inventors: Zhen Liu, Tarrytown, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 12/055,606

(22) Filed: Mar. 26, 2008

(65) Prior Publication Data

US 2009/0249370 A1 Oct. 1, 2009

(51) Int. Cl.
*G06F 13/00* (2006.01)

(52) U.S. Cl.
USPC .......................................... 719/330

(58) Field of Classification Search
USPC .......................................... 719/330
See application file for complete search history.

(56) References Cited

U.S. PATENT DOCUMENTS

| | | |
|---|---|---|
| 4,571,678 A | 2/1986 | Chaitin |
| 5,159,685 A | 10/1992 | Kung |
| 5,187,788 A | 2/1993 | Marmelstein |
| 5,657,428 A | 8/1997 | Tsuruta et al. |
| 5,659,754 A | 8/1997 | Grove et al. |
| 5,675,757 A | 10/1997 | Davidson et al. |
| 5,675,805 A | 10/1997 | Boldo et al. |
| 5,696,693 A | 12/1997 | Aubel et al. |
| 5,937,195 A | 8/1999 | Ju et al. |
| 5,999,729 A | 12/1999 | Tabloski, Jr. et al. |
| 6,032,142 A | 2/2000 | Wavish |
| 6,053,951 A | 4/2000 | McDonald et al. |
| 6,339,783 B1 * | 1/2002 | Horikiri .................. 709/203 |
| 6,347,320 B1 | 2/2002 | Christensen et al. |
| 6,430,698 B1 | 8/2002 | Khalil et al. |
| 6,601,112 B1 | 7/2003 | O'Rourke et al. |
| 6,665,863 B1 | 12/2003 | Lord et al. |
| 6,721,747 B2 | 4/2004 | Lipkin |
| 6,792,595 B1 | 9/2004 | Storistenau et al. |
| 6,799,184 B2 | 9/2004 | Bhatt et al. |
| 6,813,587 B2 | 11/2004 | McIntyre et al. |
| 6,891,471 B2 | 5/2005 | Yuen et al. |
| 6,983,446 B2 | 1/2006 | Charisius et al. |
| 7,000,022 B2 | 2/2006 | Lisitsa et al. |
| 7,062,762 B2 | 6/2006 | Krishnamurthy et al. |
| 7,103,873 B2 | 9/2006 | Tanner et al. |
| 7,164,422 B1 | 1/2007 | Wholey, III et al. |
| 7,174,536 B1 | 2/2007 | Kothari et al. |
| 7,222,182 B2 | 5/2007 | Lisitsa et al. |
| 7,231,632 B2 | 6/2007 | Harper |

(Continued)

OTHER PUBLICATIONS

Zhen Liu, Anand Ranganathan, and Anton Riabov, A Planning Approach for Message-Oriented Semantic Web Service Composition, in AAAI-2007.

(Continued)

*Primary Examiner* — Andy Ho
(74) *Attorney, Agent, or Firm* — F. Chau & Associates, LLC; William Stock

(57) ABSTRACT

A method for service invocation, including: receiving a first request for a service to be invoked, wherein the first request includes a semantic description of the service; creating a processing graph for the first request from planning domain descriptions of a plurality of services; deploying the processing graph in an execution environment as a composite service; invoking the composite service; and returning a response provided by the invoked composite service.

25 Claims, 6 Drawing Sheets

(56) References Cited

U.S. PATENT DOCUMENTS

| | | |
|---|---|---|
| 7,263,694 B2 | 8/2007 | Clewis et al. |
| 7,290,244 B2 | 10/2007 | Peck et al. |
| 7,334,216 B2 | 2/2008 | Molina-Moreno et al. |
| 7,409,676 B2 | 8/2008 | Agarwal et al. |
| 7,426,721 B1 | 9/2008 | Saulpaugh et al. |
| 7,466,810 B1 | 12/2008 | Quon et al. |
| 7,472,379 B2 | 12/2008 | Chessell et al. |
| 7,499,906 B2 | 3/2009 | Kloppmann et al. |
| 7,536,676 B2 | 5/2009 | Baker et al. |
| 7,543,284 B2 | 6/2009 | Bolton et al. |
| 7,565,640 B2 | 7/2009 | Shukla et al. |
| 7,614,041 B2 | 11/2009 | Harper |
| 7,627,808 B2 | 12/2009 | Blank et al. |
| 7,657,436 B2 | 2/2010 | Elmore et al. |
| 7,681,177 B2 | 3/2010 | LeTourneau |
| 7,685,566 B2 | 3/2010 | Brown, Jr. et al. |
| 7,716,167 B2 | 5/2010 | Colossi et al. |
| 7,716,199 B2 | 5/2010 | Guha |
| 7,730,467 B1 | 6/2010 | Hejlsberg et al. |
| 7,756,855 B2 | 7/2010 | Ismalon |
| 7,769,747 B2 | 8/2010 | Berg et al. |
| 7,773,877 B2 | 8/2010 | Yang et al. |
| 7,792,836 B2 | 9/2010 | Taswell |
| 7,797,303 B2 | 9/2010 | Roulland et al. |
| 7,809,801 B1 | 10/2010 | Wang et al. |
| 7,810,085 B2 | 10/2010 | Shinnar et al. |
| 7,814,123 B2 | 10/2010 | Nguyen et al. |
| 7,827,210 B2 | 11/2010 | Meliksetian et al. |
| 7,860,863 B2 | 12/2010 | Bar-Or et al. |
| 7,861,151 B2 | 12/2010 | Milic-Frayling et al. |
| 7,877,387 B2 | 1/2011 | Hangartner |
| 7,882,485 B2 | 2/2011 | Feblowitz et al. |
| 7,886,269 B2 | 2/2011 | Williams et al. |
| 7,886,273 B2 | 2/2011 | Hinchey et al. |
| 7,900,201 B1 | 3/2011 | Qureshi et al. |
| 7,954,090 B1 | 5/2011 | Qureshi et al. |
| 7,958,148 B2 | 6/2011 | Barnes et al. |
| 7,984,417 B2 | 7/2011 | Ben-Zvi et al. |
| 7,984,423 B2 | 7/2011 | Kodosky et al. |
| 7,992,134 B2 | 8/2011 | Hinchey et al. |
| 8,001,527 B1 | 8/2011 | Qureshi et al. |
| 8,032,522 B2 | 10/2011 | Goldstein et al. |
| 8,037,036 B2 | 10/2011 | Blumenau et al. |
| 8,046,737 B2 | 10/2011 | Wittenberg et al. |
| 8,078,487 B2 | 12/2011 | Li et al. |
| 8,078,953 B2 | 12/2011 | Kunz et al. |
| 8,086,598 B1 | 12/2011 | Lamb et al. |
| 8,122,006 B2 | 2/2012 | de Castro Alves et al. |
| 2002/0109706 A1 | 8/2002 | Lincke et al. |
| 2004/0015783 A1 | 1/2004 | Lennon et al. |
| 2004/0249664 A1 | 12/2004 | Broverman et al. |
| 2005/0096960 A1 | 5/2005 | Plutowski et al. |
| 2005/0097224 A1* | 5/2005 | Chen et al. ............ 709/246 |
| 2005/0125738 A1 | 6/2005 | Srivastava et al. |
| 2005/0125739 A1 | 6/2005 | Thompson et al. |
| 2005/0159994 A1 | 7/2005 | Huddleston et al. |
| 2005/0172306 A1 | 8/2005 | Agarwal et al. |
| 2005/0177406 A1 | 8/2005 | Facciorusso et al. |
| 2005/0192870 A1 | 9/2005 | Geddes |
| 2006/0212836 A1* | 9/2006 | Khushraj et al. ............ 715/866 |
| 2007/0033590 A1* | 2/2007 | Masuouka et al. ............ 718/100 |
| 2007/0043607 A1 | 2/2007 | Howard et al. |
| 2007/0112777 A1 | 5/2007 | Field et al. |
| 2007/0129953 A1 | 6/2007 | Cunningham et al. |
| 2007/0136281 A1 | 6/2007 | Li et al. |
| 2007/0190499 A1 | 8/2007 | Baur |
| 2007/0204020 A1 | 8/2007 | Anderson et al. |
| 2007/0208685 A1 | 9/2007 | Blumenau |
| 2007/0244912 A1 | 10/2007 | Kawaguchi |
| 2007/0245298 A1 | 10/2007 | Grabarnik et al. |
| 2007/0250331 A1 | 10/2007 | Liu et al. |
| 2007/0282746 A1* | 12/2007 | Anke et al. ............ 705/51 |
| 2008/0065455 A1 | 3/2008 | Sun et al. |
| 2008/0086485 A1 | 4/2008 | Paper |
| 2008/0140778 A1 | 6/2008 | Banavar et al. |
| 2008/0168529 A1 | 7/2008 | Anderson et al. |
| 2008/0243484 A1 | 10/2008 | Mohri et al. |
| 2009/0070165 A1 | 3/2009 | Baeuerle et al. |
| 2009/0100407 A1 | 4/2009 | Bouillet et al. |
| 2009/0125366 A1 | 5/2009 | Chakraborty et al. |
| 2009/0177957 A1 | 7/2009 | Bouillet et al. |
| 2009/0192783 A1 | 7/2009 | Jurach, Jr. et al. |
| 2009/0276753 A1 | 11/2009 | Bouillet et al. |
| 2010/0293043 A1 | 11/2010 | Atreya et al. |
| 2011/0078285 A1 | 3/2011 | Hawkins et al. |

OTHER PUBLICATIONS

Narayanan, S., and McIlraith, S. 2002, Simulation, verification and automated composition of web services, in WWW'02.

Sirin, E., and Parsia, B. 2004, Planning for Semantic Web Services, in Semantic Web Services Workshop at 3rd ISWC.

Traverso, P., and Pistore, M. 2004, Automated composition of semantic web services into executable processes, in ISWC'04.

A. Riabov, and Z. Liu, Planning for Stream Processing Systems, in Proceedings of AAAI-05, 2005.

M. Xie et al., An Additive Reliability Model for the Analysis of Modular Software Failure Data, IEEE, Oct. 24, 1995, pp. 188-193.

F.J. Groen, et al., Reliability Data Collection and Analysis System, IEEE, Aug. 24, 2004, pp. 43-48.

C. Rostoker et al., "A Parallel Workflow for Real-time Correlation and Clustering of High-Frequency Stock Market Data", (Mar. 26-30, 2007), Parallel and Distributed Processing Symposium, 2007. IPDPS 2007. IEEE International pp. 1-10.

Rana et al., "An XML Based Component Model for Generating Scientific Applications and Performing Large Scale Simulations in a Meta-computing Environment", Google 2000, pp. 210-224.

Santos-Neto et al., "Tracking Usage in Collaborative Tagging Communities", Google 2007, pp. 1-8.

Li et al., "Collaborative Tagging Applications and Approaches", IEEE Sep. 2008, pp. 1-8.

Altinel, et al, "Damia—A Data Mashup Fabric for Intranet Applications", VLDB '07, Sep. 23-28, 2007, pp. 1370-1373.

D.. Hinchcliffe, "A bumper crop of new mashup platforms".

Navendu Jain, Lisa Amini, Henrique Andrade, Richard King, Yoonho Park, Philippe Selo and Chitra Venkatramani, "Designed, Implementation, and Evaluation of the Linear Road benchmark on the Stream Processing Core", Proceedings of ACM SIGMOD 2006.

Zhen Liu, Anand Ranganathan and Anton Riabov, "A Planning Approach for Message-Oriented Semantic Web Service Composition", in AAAI-2007.

Marti Hearst, Design Recommendations for Hierarchical Faceted Search Interfaces, ACM SIGIR Workshop on Faceted Search, Aug. 2006.

A. Riabov, Z. Liu Planning for Stream Processing Systems. In Proceedings of AAAI-05.

Riabov et al., Wishful Search: Interactive Composition of Data Mashups, Google 2008, pp. 775-784.

Habernal et al., Active Tags for Semantic Analysis, Google 2008, pp. 69-76.

A. Riabov and Z. Liu Scalable Planning for Distributed Stream Processing Systems. In ICAPS '06, 2006.

E. Sirin and B. Persia. Planning for Semantic Web Services. In Semantic Web Services Workshop at 3rd ISWC, 2004.

K. Whitehouse, F. Zhao and J. Liu. Semantic Streams: a Framework for Composable Semantic Interpretation of Sensor Data. In EWSN '06, 2006.

M. Pistore, P. Traverso, P. Bertoli and A. Marconi. Automated Synthesis of Composite BPEL4WS Web Services. In ICWS, 2005.

Baird, R.; Hepner, M.; Jorgenson, N.; Gamble, R., "Automating Preference and Change in Workflows," Seventh International Conference on Composition-Based Software Systems (Feb. 25-29, 2008), pp. 184-193.

Pistore, M.; Barbon, F.; Bertoli, P.; Shaparau, D.; Travers°, P., "Planning and Monitoring Web Service Composition" (2004), AIMSA 2004, LNAI 3192, pp. 106-115.

Peer, J. "Web Service Composition As AI Planning—A Survey", (2005).

(56) References Cited

OTHER PUBLICATIONS

Hepner, M., "Dynamic Changes to Worfow insances of Web Sevices," (2007), Univesty of Tulsa.

A. Stentz, The Focused D* Algorithm for Real-Time Replanning (IJCAI-1995).

Heinlein, C. "Workflow and Process Synchronization with Interaction Expressions and Graphs", 2001, IEEE, p. 243-252.

Bohannon et al, "Optimizing view queries to ROLEX to support navigable results trees", ACM, pp. 1-12, 2002.

Sheshagiri et al., "A Planner for Composing Services Described in DAML-S", ACM 2003, pp. 1-5.

Akkiraju et al., "SEMAPLAN: Combining Planning with Semantic Matching to Achieve Web Service Composition", American Association for Artificial Intelligence 2005, pp. 1-8.

Connor et al, "Key key value stores for efficiently processing graph data in the cloud", IEEE, pp. 88-93, 2011.

Ma et al, "Mining web graphs for recommendations", IEEE, pp. 1-14, 2011.

Jiang et al, "XML RL update language: syntax and semantics", IEEE, pp. 810-816, 2010.

Comito et al, "Selectively based XML query processing in structured peer to peer networks", ACM IDEAS, pp. 236-244, 2010.

Lyritsis et al, "TAGs; Scalable threshold based algorithms for proximity computation in graphs", ACM EDBT, pp. 295-306, 2011.

* cited by examiner

METHOD AND APPARATUS FOR DYNAMIC WEB SERVICE COMPOSITION AND INVOCATION

RELATED APPLICATIONS

This application is related to commonly assigned U.S. application Ser. No. 11/872,385, filed Oct. 15, 2007, commonly assigned U.S. application Ser. No. 11/970,262, filed Jan. 7, 2008, commonly assigned U.S. application Ser. No. 11/971,056, filed Jan. 8, 2008 and commonly assigned U.S. application Ser. No. 11/971,068, filed Jan. 8, 2008, the disclosures of which are all incorporated by reference herein in their entirety.

BACKGROUND OF THE INVENTION

1. Technical Field

The present invention relates to web service composition and invocation.

2. Discussion of the Related Art

Web Service Composition Using Planning

Automated planning can be used to create composite applications in compositional architectures, such as web services and stream processing. The applications are workflows composed of smaller modular components, such as service invocations or other (smaller) workflows.

In many scenarios, the components are service invocations (such as web service invocations or invocation of a method of a Java class), and can be described in terms of their data effects and preconditions. In particular, we assume that a description (such as Web Services Description Language (WSDL) or Java object code with optional metadata annotations) of each service specifies the input requirements of the service (such as data type, semantics, access control labels, etc.). We refer to these input requirements as preconditions of service invocation, or simply preconditions. The description also specifies the effects of the service, describing the outputs of the service, including information related to data type and semantics of the output, for example. In general, a service description may describe outputs as a function of inputs, so that the description of the output can only be fully determined once the specific inputs of the service have been determined. Note that in practical implementations the invocations can be synchronous, such as subroutine or Remote Procedure Call (RPC) calls, or asynchronous, such as asynchronous procedure calls or message exchange or message flow.

Under these assumptions, an automated planner can be used to automatically assemble workflows based on a user-provided description of the desired output of the application. The descriptions of the components are provided to the planner in the form of a domain description. The planner can also take into account the specification of available primal inputs to the workflow, if not all inputs are available for a particular planning request.

The planner composes a workflow by connecting components, starting from the primal inputs. It evaluates possible combinations of components, by computing descriptions of component outputs, and comparing them to preconditions of components connected to the output. More than one component input can be connected to one component output or primal input. Logically, this amounts to sending multiple copies of data produced by the component output, with one copy sent to each of the inputs. In practical implementation, these do not have to be copies, and it is possible to pass data by reference instead of by value. The process terminates when an output of a component (or a set of outputs taken together) satisfy the conditions specified in the user requirement. Note that all conditions are evaluated at plan time, before any applications are deployed or executed.

If multiple alternative compositional applications can be constructed and shown to satisfy the same request, the planner may use heuristics and utility functions to rank the alternatives and selected preferred plans.

The application, once composed, is deployed in an execution environment and can be executed one or more times.

Examples of a planner and an execution environment are described in Zhen Liu, Anand Ranganathan and Anton Riabov, A Planning Approach for Message-Oriented Semantic Web Service Composition, in AAAI-2007.

Similar work has been done in the contexts of Stream Processing, Web Services and Grid Computing. In particular, the following papers describe different approaches to automatic composition of web services using planning: Narayanan, S., and McIlraith, S. 2002. Simulation, verification and automated composition of web services. In WWW'02; Sirin, E., and Parsia, B. 2004. Planning for Semantic Web Services. In SemanticWeb ServicesWorkshop at 3rd ISWC; and Traverso, P., and Pistore, M. 2004. Automated composition of semantic web services into executable processes. In ISWC'04.

An example of automated service composition using planning is described in commonly assigned U.S. application Ser. No. 11/970,262, filed Jan. 7, 2008, which includes a detailed description of service composition using a tag-based specification of processing goals.

Existing service composition approaches involve two steps. First, a composite service is composed, either manually or using automated tools such as planners. Then, the composite service is deployed in an application server environment, such as Websphere, and assigned an external invocation identifier, such as a Uniform Resource Locator (URL) and request interface. After the two steps are complete, the service is ready to be used and can be invoked by clients. This process, including repeated invocation, is illustrated in FIG. 1. The steps of receiving composition request (105), composition (110) and deployment (115) are usually performed by the automatic composition system, and the steps of receiving execution request (120) and service execution (125) are performed by the execution environment.

Note that in this process there is also an optional step of publishing the description of the composite service in a service registry.

This approach, however, requires human involvement when a new composition is created. The replacement service is again assigned an invocation identifier and a certain request interface.

This process introduces noticeable delay in updates of the service. In addition, when the composed service is hosted by a different party (provider) than the one owning the client that makes calls to the service, the clients must depend on the provider to make updates. Finally, the clients cannot easily create new compositions, and again require the services of the provider if new composition is needed.

Web Service Invocation

Web services are commonly described in WSDL (http://www.w3.org/TR/wsdl.html). A WSDL document defines services as collections of network endpoints, or ports. In WSDL, the abstract definition of endpoints is separated from their concrete network deployment, which is described separately within the WSDL document in a service binding. Invocation of a web service described in WSDL requires identifying a service port and a corresponding binding, and subsequently contacting the service by sending a message to the port using the protocol and the contact information obtained from the binding. Note that any service called via this mechanism must have a corresponding WSDL document. Hence, for each composed service a WSDL document must be created before the service can be used by clients. Because of this, WSDL-based mechanisms are not used to address many problems in existing service composition.

Representing Composed Web Services

A number of languages for describing compositions of services have been developed. One example of such language is WS-Business Process Execution Language (WS-BPEL) described in WS-BPEL 2.0 specification (OASIS standard), http://docs.oasis-open.org/wsbpel/2.0/wsbpel-v2.0.pdf.

Composing services using languages such as BPEL requires describing details of service selection, composition and parameterization. Systems that implement web service composition using planning are easier to use since they require only a minimally sufficient high-level description of the service as input, and generate a detailed description of the composition in WS-BPEL or a similar language.

SUMMARY OF THE INVENTION

In an exemplary embodiment of the present invention, a method for service invocation, comprises: receiving a first request for a service to be invoked, wherein the first request includes a semantic description of the service; creating a processing graph for the first request from planning domain descriptions of a plurality of services; deploying the processing graph in an execution environment as a composite service; invoking the composite service; and returning a response provided by the invoked composite service.

The semantic description of the service includes a set of tags that describe the service. The service is a web service.

The composite service is invoked with a parameter extracted from the first request.

The method further comprises storing the first request and information required to execute the deployed processing graph.

The method further comprises: receiving a second request for a service to be invoked, wherein the second request includes a semantic description of the service; and determining if the second request is the same as the stored first request, wherein if the first and second requests are the same: re-invoking the composite service with a parameter extracted from the first request; and returning an updated response provided by the invoked composite service.

The method further comprises: receiving a second request for a service to be invoked, wherein the second request includes a semantic description of the service; and determining if the second request is the same as the stored first request, wherein if the first and second requests are the same: determining if the planning domain descriptions have changed after the stored first request has been processed, wherein if the planning domain descriptions have not been changed: re-invoking the composite service; and returning an updated response provided by the invoked composite service.

The composite service is re-invoked with a parameter extracted from the second request.

The method further comprises: receiving a second request for a service to be invoked, wherein the second request includes a semantic description of the service; and determining if the second request is the same as the stored first request, wherein if the first and second requests are the same: determining if the planning domain descriptions have changed after the stored first request has been processed, wherein if the planning domain descriptions have been changed: creating a processing graph for the second request from the changed planning domain descriptions; deploying the processing graph for the second request in an execution environment as a new composite service; invoking the new composite service; and returning a response provided by the newly invoked composite service.

The new composite service is invoked with a parameter extracted from the second request.

In an exemplary embodiment of the present invention, a system for service invocation, comprises: a memory device for storing a program; a processor in communication with the memory device, the processor operative with the program to: receive a first request for a service to be invoked, wherein the first request includes a semantic description of the service; create a processing graph for the first request from planning domain descriptions of a plurality of services; deploy the processing graph in an execution environment as a composite service; invoke the composite service; and return a response provided by the invoked composite service.

The semantic description of the service includes a set of tags that describe the service. The service is a web service.

The processor is further operative with the program to store the first request and information required to execute the deployed processing graph.

The processor is further operative with the program to: receive a second request for a service to be invoked, wherein the second request includes a semantic description of the service; and determine if the second request is the same as the stored first request, wherein if the first and second requests are the same: re-invoke the composite service with a parameter extracted from the first request; and return an updated response provided by the invoked composite service.

The processor is further operative with the program to: receive a second request for a service to be invoked, wherein the second request includes a semantic description of the service; and determine if the second request is the same as the stored first request, wherein if the first and second requests are the same: determine if the planning domain descriptions have changed after the stored first request has been processed, wherein if the planning domain descriptions have not been changed: re-invoke the composite service; and return an updated response provided by the invoked composite service.

The processor is further operative with the program to: receive a second request for a service to be invoked, wherein the second request includes a semantic description of the service; and determine if the second request is the same as the stored first request, wherein if the first and second requests are the same: determine if the planning domain descriptions have changed after the stored first request has been processed, wherein if the planning domain descriptions have been changed: create a processing graph for the second request from the changed planning domain descriptions; deploy the processing graph for the second request in an execution environment as a new composite service; invoke the new composite service; and return a response provided by the newly invoked composite service.

In an exemplary embodiment of the present invention, a computer readable storage medium storing instructions that, when executed by a computer, cause the computer to perform a method for service invocation, the method comprising: receiving a first request for a service to be invoked, wherein the first request includes a semantic description of the service; creating a processing graph for the first request from planning domain descriptions of a plurality of services; deploying the processing graph in an execution environment as a composite service; invoking the composite service; and returning a response provided by the invoked composite service.

The semantic description of the service includes a set of tags that describe the service. The service is a web service.

The method further comprises storing the first request and information required to execute the deployed processing graph.

The method further comprises: receiving a second request for a service to be invoked, wherein the second request includes a semantic description of the service; and determining if the second request is the same as the stored first request, wherein if the first and second requests are the same: re-invoking the composite service with a parameter extracted from the first request; and returning an updated response provided by the invoked composite service.

The method further comprises: receiving a second request for a service to be invoked, wherein the second request includes a semantic description of the service; and determining if the second request is the same as the stored first request, wherein if the first and second requests are the same: determining if the planning domain descriptions have changed after the stored first request has been processed, wherein if the planning domain descriptions have not been changed: re-invoking the composite service; and returning an updated response provided by the invoked composite service.

The method further comprises: receiving a second request for a service to be invoked, wherein the second request includes a semantic description of the service; and determining if the second request is the same as the stored first request, wherein if the first and second requests are the same: determining if the planning domain descriptions have changed after the stored first request has been processed, wherein if the planning domain descriptions have been changed: creating a processing graph for the second request from the changed planning domain descriptions; deploying the processing graph for the second request in an execution environment as a new composite service; invoking the new composite service; and returning a response provided by the newly invoked composite service.

In an exemplary embodiment of the present invention, a method for web service invocation, comprises: receiving a web service invocation request from a client, wherein the request includes a set of tags that explicitly describe functions to be performed by the web service; translating the request into a processing goal and composing a processing graph that satisfies the processing goal; deploying the processing graph in an execution environment as a composite web service; invoking the composite web service; and returning a response provided by the invoked composite web service to the client.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Before discussing exemplary embodiments of the present invention in detail, we will first provide a brief summary of the invention.

Consider the scenario where the composed service is created by a planner automatically based on a user's request specifying a processing goal and a planning domain describing a set of available parameters and other parameters affecting planning.

In this invention, we propose for clients to invoke service based not on an invocation identifier, such as a service name, but based on the planning goal expressed as a set of tags describing the service, for example. The server receiving such service invocation request, will first compose and then invoke the service as part of processing the request. This approach has two benefits, for example. First, services can be automatically and instantaneously created when needed by clients, by simply specifying the goal. Second, if changes to the planning domain occur, replanning can be carried out on each invocation, taking into account the changes immediately.

A case addressed by the replanning aspect of this invention involves the situation where changes to the planning domain are triggered by changes in the set of available services. This corresponds to a dynamic service registry, where services come online and go offline, as is likely to happen in large heterogeneous networks such as the Internet.

Also provided in this invention is a technique for caching planning requests to prevent calling the planner at each service invocation. Here, the system can store the processing graph previously produced for a request. Thus, the next time the same request is received, the system can reuse the stored graph, unless there were changes to the planning domain that could cause a different graph to be produced for the same request.

Now that the brief summary is complete, an exemplary embodiment of the present invention implemented without caching, will be described.

Implementation with Independent Processing of Requests

In this section, we will describe an implementation that processes each request individually. Later, in another section, we will revisit this implementation and describe how to achieve further improvements to response time and resource utilization by caching requests.

Figure 1:
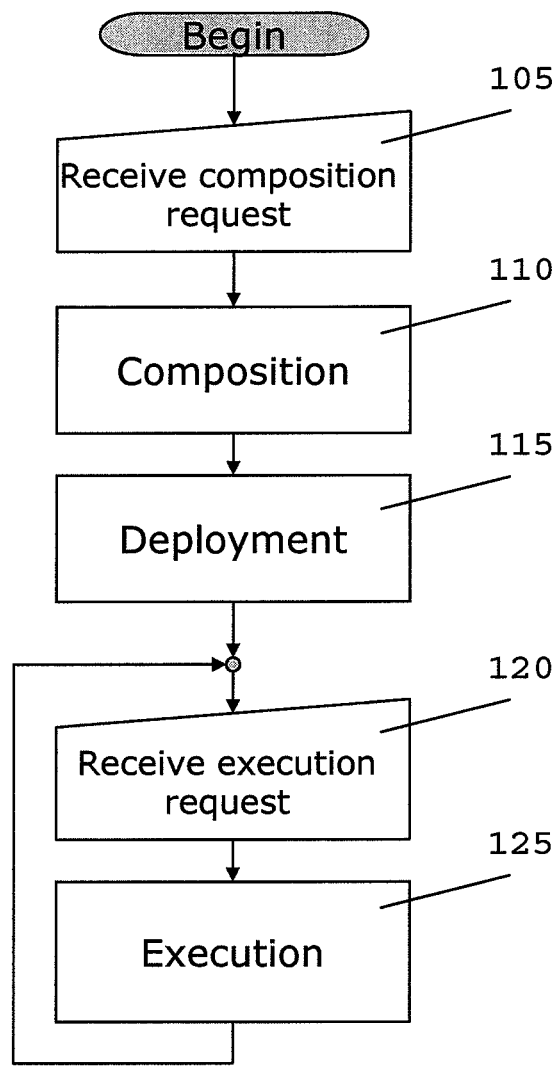
FIG. 1 is a flowchart that illustrates a lifecycle of a composed service according to the prior art.
Figure 2:
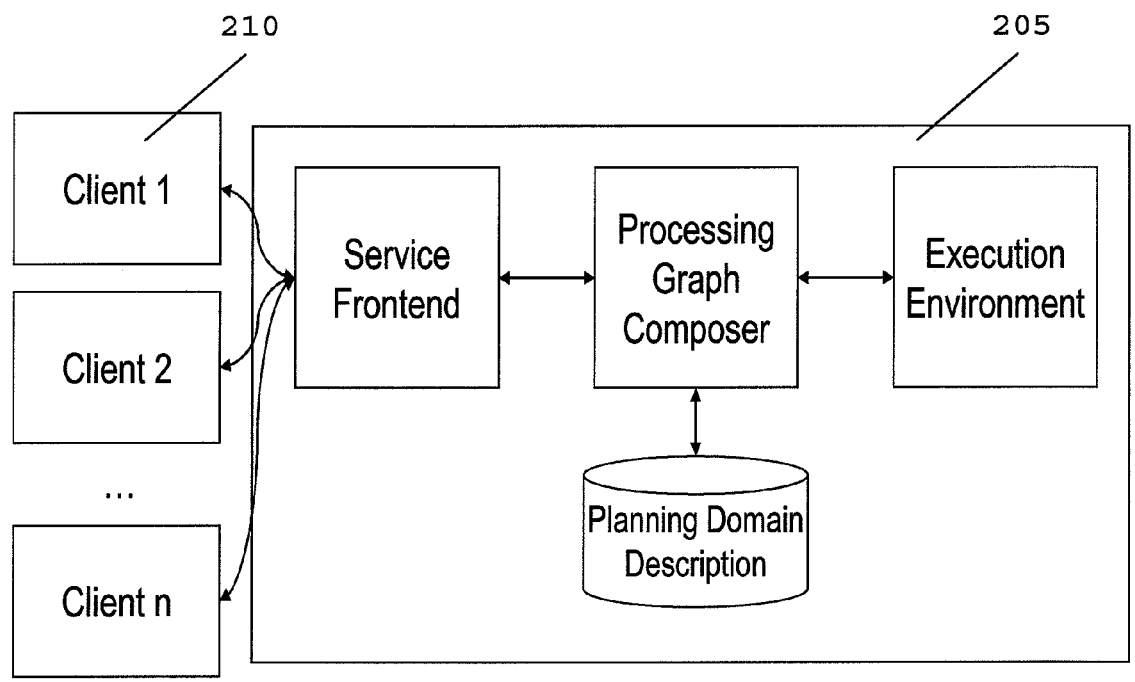
FIG. 2 is a block diagram that illustrates a system according to an exemplary embodiment of the present invention.

The main modules of the system 205 are shown in FIG. 2 (note that clients 210 of the system 205 that are shown on the left are not part of the system 205 itself). The clients 210 may be computers operated under human or non-human control that interact with the system 205 over a network, for example. The service frontend module is responsible for interfacing with the clients 210, namely for receiving requests from the clients 210 and providing responses to the requests. The processing graph composer generates processing graphs and deploys the graphs in the execution environment. The execution environment executes the processing graphs by orchestrating and executing individual service components.

The clients 210 interact with the system 205 by submitting requests for service invocation. Unlike requests in existing web service environments (e.g., WS-Simple Object Access Protocol (WS-SOAP) or JavaScript Object Notation-RPC (JSON-RPC) the requests contain a high-level semantic description of the service instead of the name of the service. In particular, this invention relates to the case when the requests are used to invoke remote procedures implemented by web services. The description of the service, for example, can be provided as a set of tags describing the service.

For example, consider the following JSON-RPC method invocation request.

```
{"method": "getShippingCostInEuro", "params":
["10598","11797"], "id": null}
```

This request is processed by the web service that receives it. As shown above, the request includes a data structure, defining a method to be called, parameters of the method, and an 'id', which is an optional identifier of the request. In JSON-RPC, the web service receiving the request knows how to process the request referring to method getShippingCostinEuro, which is typically implemented as a method of a class in a programming language, such as Java or Python.

Such remote method calls implemented as web service invocation requests can also be represented in WS-SOAP or an even simpler Representational State Transfer (REST) request, or a similar Hypertext Transfer Protocol (HTTP) request. For example, the service can be invoked via an HTTP GET request via the following URL.

```
http://www.example.com/getShippingCostInEuro?from=10598&to=11797
```

The URL above consists of a host name www.example.com that is used by the clients 210 for locating the server and sending requests to it, base request /getShippingCostInEuro, which is an implementation-specific identifier of a method, and finally, request parameters "from" and "to" with values 10598 and 11797, representing zip codes of origin and destination for shipping. The set of parameters, request name and host name are used only as examples, and may vary in practical implementation of services.

A key innovation described in this disclosure is that of replacing the method name in the request with a description of the method, specified as a set of tags, for example. Then, an automatic composer is used to create a method of implementation for the description, where the implementation of the method is represented as a processing graph consisting of invocations of service components and which transfers parameter values and results of processing between service components. For example, when in a modified JSON-RPC implementation, the request can be represented as follows.

```
{"method": "ShippingCost,EUR", "params": ["10598","11797"],
"id": null}
```

In the above request, the only change, compared to the earlier example of JSON-RPC use, is that the method name "getShippingCostInEuro" is replaced with a tag-based description of the requested service "ShippingCost,EUR".

Figure 3:
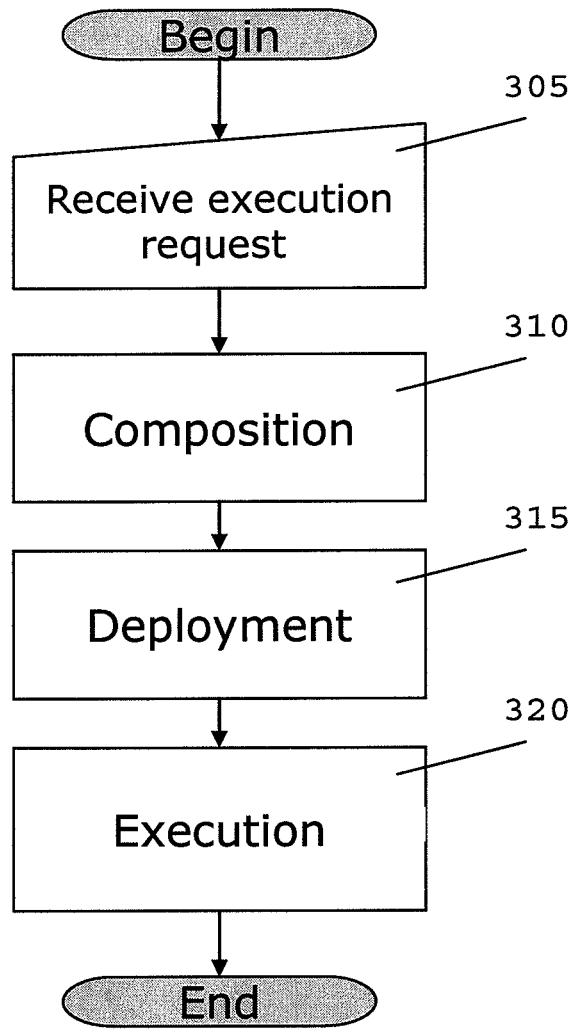
FIG. 3 is a flowchart that illustrates a method according to an exemplary embodiment of the present invention.

As shown in FIG. 3, for example, upon receiving such request (305), the service frontend passes the composition request to the processing graph composer. An exemplary processing graph composer is described in commonly assigned U.S. application Ser. No. 11/970,262, filed Jan. 7, 2008.

The composer then creates a processing graph for the request (310), as described in commonly assigned U.S. application Ser. No. 11/970,262, filed Jan. 7, 2008, represented in a format recognized by the execution environment. The processing graph is then deployed in the execution environment (315) and executed with the appropriate parameters extracted from the request (320). The response provided by the processing graph is returned to the user.

Requests can be represented alternatively in a modified WS-SOAP representation, by replacing the method name with the method description as shown in the example above. Similarly, the HTTP GET request URL in the example above can be modified to represent the method description, for example, separated by "/", as shown below.

```
http://www.example.com/get/ShippingCost/EUR?from=10598&to=11797
```

The HTTP GET request URL can also be represented as an additional parameter, as shown below.

```
http://www.example.com/get?_q=ShippingCost,EUR&from=10598&
to=11797
```

As in the JSON-RPC example, the response to the request is provided by the processing graph composed by the composer and deployed in the execution environment.

An exemplary embodiment of the present invention implemented with caching, will now be described.

Implementation with Deployment Caching

The implementation described above can be extended to avoid unnecessary composition and deployment for a received request in cases when the processing graph for a request has already been deployed and composed for the same request received earlier. The extended system includes a cache that stores previously received requests and information required to execute the deployed processing graph.

Note that a different processing graph can be produced for the same request if the planning domain information used for composition is changed.

Figure 4:
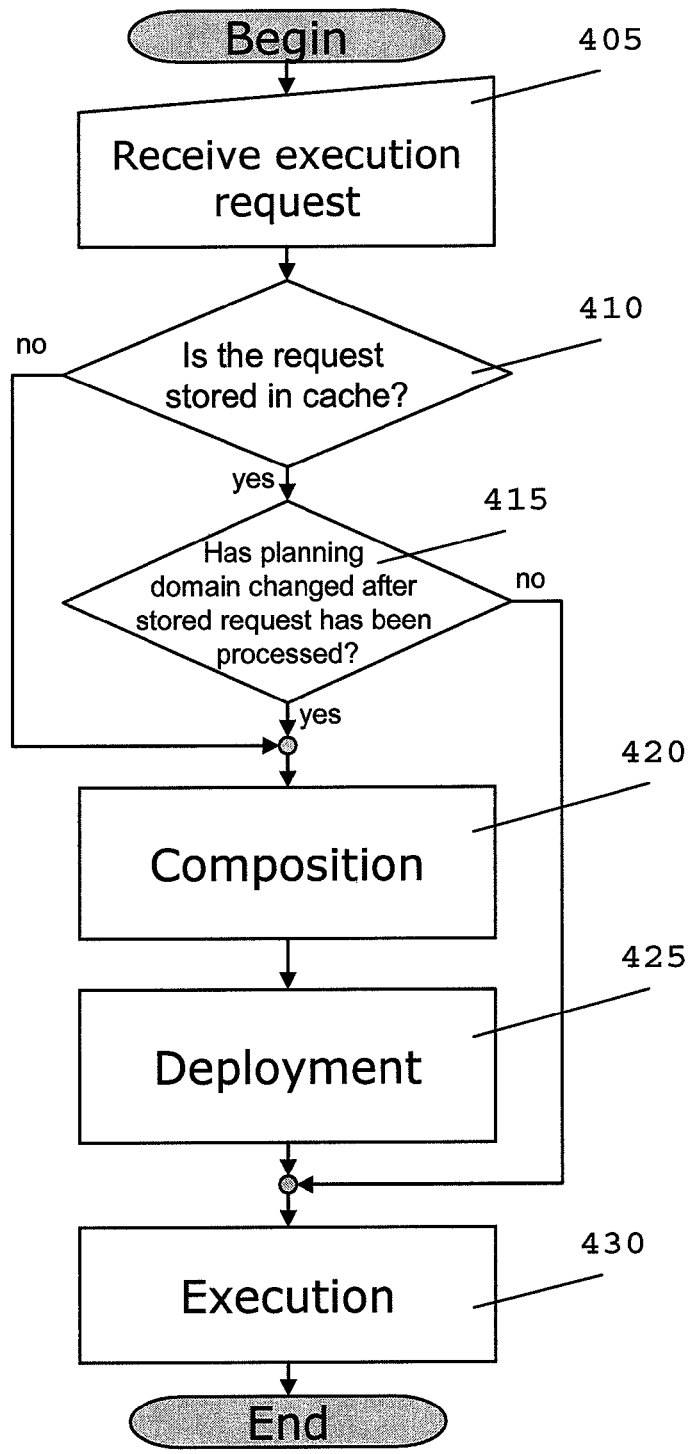
FIG. 4 is a flowchart that illustrates a method according to an exemplary embodiment of the present invention.
Figure 5:
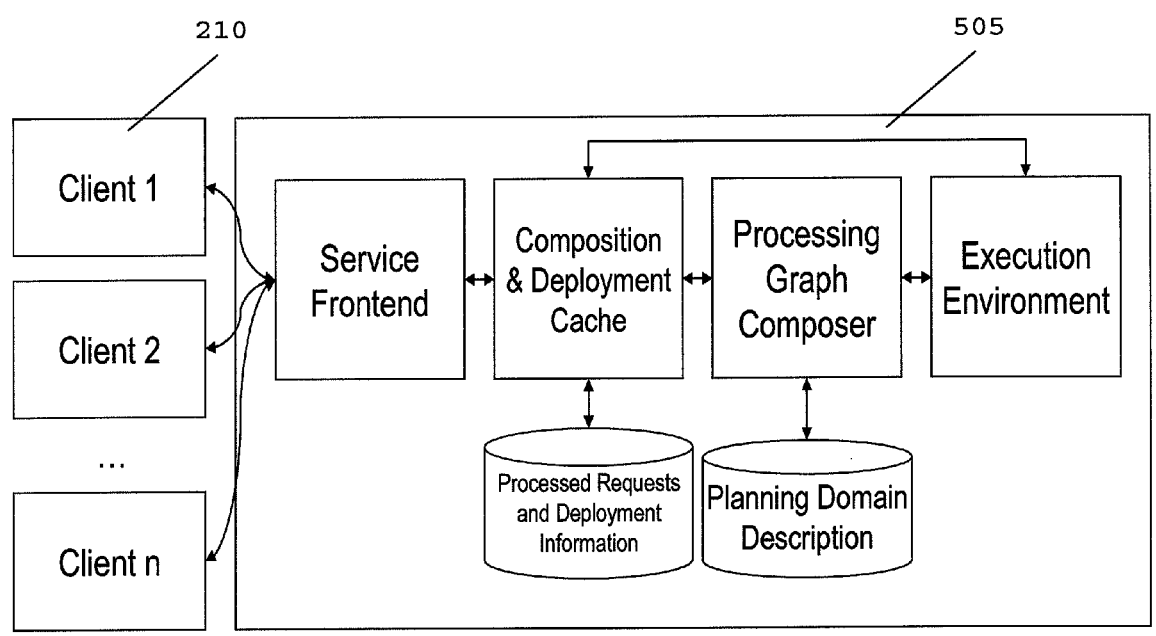
FIG. 5 is a block diagram that illustrates a system according to an exemplary embodiment of the present invention.

The overall procedure for processing the requests using composition and deployment caching is shown in FIG. 4. A sample system implementation 505 is shown in FIG. 5. As shown in FIG. 5, the new system module is responsible for storing the processing graph requests and the corresponding deployment information required for execution of processing graphs.

As shown in FIG. 4, after receiving a request (405), if it is determined by the composition and deployment cache, during steps 410 and 415, that the previously deployed instance of a plan graph can be used to satisfy a request, that instance is accessed using the stored deployed information, and the results of execution are returned to the service frontend, and by it, to the clients 210. Thus, the steps of composition (420) and deployment (425) are skipped, and only the step of execution (430) is performed. However, if the stored request information cannot be used, either due to changes in the request (410), or changes in the planning domain (415), the processing graph composer is used to generate (420) and deploy (425) a new processing graph for the request. Information regarding this request is stored in the processed request and the deployment information store is accessible by the composition and deployment cache module.

A further detailed example of the steps of service composition, deployment and execution/invocation is now provided.

Composing Services for Specified Goals

In an exemplary embodiment, goals are represented using Stream Processing Planning Language (SPPL) predicates, as described in A. Riabov, Z. Liu. Planning for Stream Processing Systems. In Proceedings of AAAI-05, the disclosure of which is incorporated by reference herein in its entirety, and the descriptions of service components and external resources are represented as SPPL actions, with preconditions and effects corresponding to annotations on inputs and outputs of these actions. The task of generating the processing graph is then accomplished by invoking an SPPL planner to generate the highest quality plan for the specified set of actions and the goal. The plan produced by the SPPL planner can then be translated trivially into a processing graph, by mapping action instances included in the plan to instances of corresponding components in the processing graph, and establishing connections between component instances accordingly. It is also possible that the SPPL planner does not find any plans satisfying the goal. In this case, the planner reports an error condition, which is reflected in a user interface, and the processing graph is not generated.

To represent descriptions of service components and resources in SPPL, an SPPL domain description is created. The file containing the SPPL domain description is part of system configuration, and is not changed when new user-defined goals are processed. For example, consider the following SPPL planning domain definition.

```
(define (domain Example)
(:types
    _Format
    (Price - _Format)
    (ShippingCost - Price)
    _Currency
    (USD - _Currency)
    (EUR - _Currency)
    _Source
    (UPS - _Source)
    _DataType
    (_ZipCode - _DataType)
    (_FromZipCode - _ZipCode)
    (_ToZipCode - _ZipCode)
)
(:predicates :clearlogic
    (hasFormat ?x - _Format)
    (hasCurrency ?x - _Currency)
    (hasType ?x - _DataType)
)
(:predicates :orlogic
    (hasSource ?x - _Source)
)
(:constants
    (USD - USD)
    (UPS - UPS)
    (EUR - EUR)
    (ShippingCost - ShippingCost)
    (_FromZipCode - _FromZipCode)
    (_ToZipCode - _ToZipCode)
)
(:action ups
    :parameters(?fromZip - _FromZipCode  ?toZip - _ToZipCode)
    :cost(20 1)
    :precondition[in1]  ( and (hasType ?fromZip))
    :precondition[in3]  ( and (hasType ?toZip))
    :effect[id0]   ( and (hasCurrency USD)
                        (hasFormat ShippingCost)
                        (hasSource UPS) )
)
(:action InputFromZip
    :cost(-100 1)
```

-continued

```
    :effect[out] (and
                        (hasType _FromZipCode)
                  )
)
(:action InputToZip
    :cost(-100 1)
    :effect[out] (and (hasType _ToZipCode) )
)
(:action quoteUSDEUR
    :parameters(?price - Price)
    :cost(-20 1)
    :precondition[in1]   (and (hasFormat ?price) (hasCurrency USD))
    :effect[id0]    (and (hasFormat ?price) (hasCurrency EUR))
)
)
```

This domain description defines several types that correspond to tags, such as 'USD', 'Price', typed constants of several of the types, four predicates, 'hasFormat', 'hasCurrency', 'hasType' and 'hasSource' and four actions, 'ups', 'quoteUSDEUR', 'InputToZip' and 'InputFromZip'. The actions describe, correspondingly, a service component requesting a shipping price quote from UPS shipping service, a service component converting a price US dollars to an equivalent in Euro and two input parameters of type zip code. The cost vectors of actions specified in the ':cost' statements are used to compute a multi-dimensional cost vector of the plan, which is computed according to SPPL rules, i.e., by component-wise addition of cost vectors. The effect of each action describes the semantics using a formula expressed with predicates, variables and constants. Action 'quoteUSDEUR' has a parameter ?price of type Price, which is used in the expressions defining the precondition and the effect. According to SPPL rules this indicates that the output of the component is related to the same format (hasFormat ?price) predicate as its input, which expresses that the currency translation operator does not affect the format of the feed. SPPL requires that in valid plans all action parameters are bound to specific values and that all preconditions are satisfied with the descriptions of connected streams. Port names, e.g., [in1], are used to assign conditions to specific input and output ports and avoid ambiguity for components that have more than one input or more than one output.

The SPPL description of the goal is generated for the user-specified goal (i.e., set of tags), by matching tags specified in the goal to type names and including into the SPPL goal expression all predicates that have parameters of corresponding type or a super-type of the corresponding type. For example, for a goal specified as 'ShippingCost EUR' the generated SPPL goal description is as follows.

```
(define (problem ExampleGoal)
(:domain Example)
(:goal
    :parameters(?x - ShippingCost ?y - EUR)
    :precondition
    (and
        (hasFormat ?x)
        (hasCurrency ?y)
    ) )
(:objective -1 0)
(:bound 1000000 40)
)
```

Here we have extended the traditional SPPL with a parametric goral—in original SPPL the goals do not have parameters and must be specified as ground formulas. The parametric goal is interpreted similarly to a parametric action without effects, i.e., the goal is considered satisfied when the precondition is satisfied with at least one assignment of parameter values. The output of the SPPL planner is a plan. In the example above the SPPL planner output is as follows.

```
<planset>
  <grid>
    <dim number="0">
      <value>-1e+010</value>
      <value>-9.999e+009</value>
    </dim>
    <dim number="1">
      <value>0</value>
      <value>40</value>
    </dim>
  </grid>
  <plangraph
    problem="ExampleGoal"
    objective="200"
    cost="-200,4"
  >
    <node id="0" name="InputFromZip">
      <port name="out">
        <a name="hasType"><p>_FromZipCode</p></a>
      </port>
    </node>
    <node id="1" name="InputToZip">
      <port name="out">
        <a name="hasType"><p>_ToZipCode</p></a>
      </port>
    </node>
    <node id="2"
      name="ups"><p>_FromZipCode</p><p>_ToZipCode</p>
      <port name="id0">
        <a name="hasSource"><p>UPS</p></a>
        <a name="hasCurrency"><p>USD</p></a>
        <a name="hasFormat"><p>ShippingCost</p></a>
      </port>
    </node>
    <node id="3" name="quoteUSDEUR"><p>ShippingCost</p>
      <port name="id0">
        <a name="hasSource"><p>UPS</p></a>
        <a name="hasCurrency"><p>EUR</p></a>
        <a name="hasFormat"><p>ShippingCost</p></a>
      </port>
    </node>
    <node id="4" name="-Goal_0">
    <p>ShippingCost</p><p>EUR</p>
      <port name="g0">
        <a name="hasSource"><p>UPS</p></a>
        <a name="hasCurrency"><p>EUR</p></a>
        <a name="hasFormat"><p>ShippingCost</p></a>
      </port>
    </node>
    <link fromNode="1" fromPort="out" toNode="2" toPort="in3"/>
    <link fromNode="0" fromPort="out" toNode="2" toPort="in1"/>
    <link fromNode="2" fromPort="id0" toNode="3" toPort="in1"/>
    <link fromNode="3" fromPort="id0" toNode="4" toPort="Port1"/>
    <link fromNode="4" fromPort="g0" toNode="-2" toPort="_goal"/>
  </plangraph>
</planset>
```

The planner output describes a processing graph that consists of an instance of each of the actions, with the zip code inputs connected to two input ports of the 'ups' action, with the single output of 'ups' connected to the single input of 'quoteUSDEUR', and with the single output of that action connected to the goal, i.e., the final output of the plan.

This processing graph description is subsequently translated into a composite service description recognized by the execution environment, and can be deployed for execution.

The system can connect to and deploy composed services in a variety of execution environments, for example, in a web service orchestration server supporting a WS-BPEL standard, such as IBM WebSphere Business Integration Server, or in Project Zero Assemble runtime (www.projectzero.org). In another example, the deployment environment can be a Java-based parallel execution environment, which provides the ability to run services implemented either as Java code, web services or an OSGi service.

The processing graph is translated into a format recognized by the execution environment by describing services and their interconnections in the generated plan. For example, the processing graph above can be represented in the flow description language of Project Zero as follows.

```
<?xml version="1.0" encoding="UTF-8"?>
<process name="mario14">
  <receiveGET name="receiver"/>
  <ups name="l2_UPS">
    <input name="in1" value="receiver_Output.FromZip[0]"/>
    <input name="in3" value="receiver_Output.ToZip[0]"/>
  </ups><quote name="l3_op">
    <input name="in1" value="'USDEUR'"/>
    <input name="in2" value="l2_UPS"/>
  </quote><replyGET name="reply">
    <input value="l3_op"/>
  </replyGET>
</process>
```

This description of the composed service can then be deployed in a Project Zero server, by placing this description in a file "example.flow" under a "public" directory of the server. With a default server configuration installed on a host with domain name www.example.com, and assuming services "ups" and "quote" are implemented as Project Zero activities, an HTTP GET request to the following URL:

http://www.example.com:8080/example.flow?FromZip=10598&ToZip=11797 will return a document containing the cost or costs of shipping from zip code 10598 to zip code 11797. The exact format of this document depends on the implementation of the individual services, as well as on actual prices in effect, and can be, for example, the following.

EUR 23 Express Delivery
EUR 18 Ground Shipping

In this example, the information stored about the service in the cache can include service URL (i.e., http://www.example.com:8080/example.flow) and the description of the service {ShippingCost, EUR}. The cache of composed services can then be used to retrieve and invoke the URL if the same request for service {Shippingcost, EUR} is received, without repeating the steps of composing and deploying the service. However, the second request can specify different values of FromZip and ToZip parameters, and the cached service must then be invoked with these new parameters. In this case, only the URL of the composed service is cached, but not the result returned by the service.

A brief hardware description of a computer in which the system or parts of the system described above may be implemented will now be described.

Figure 6:
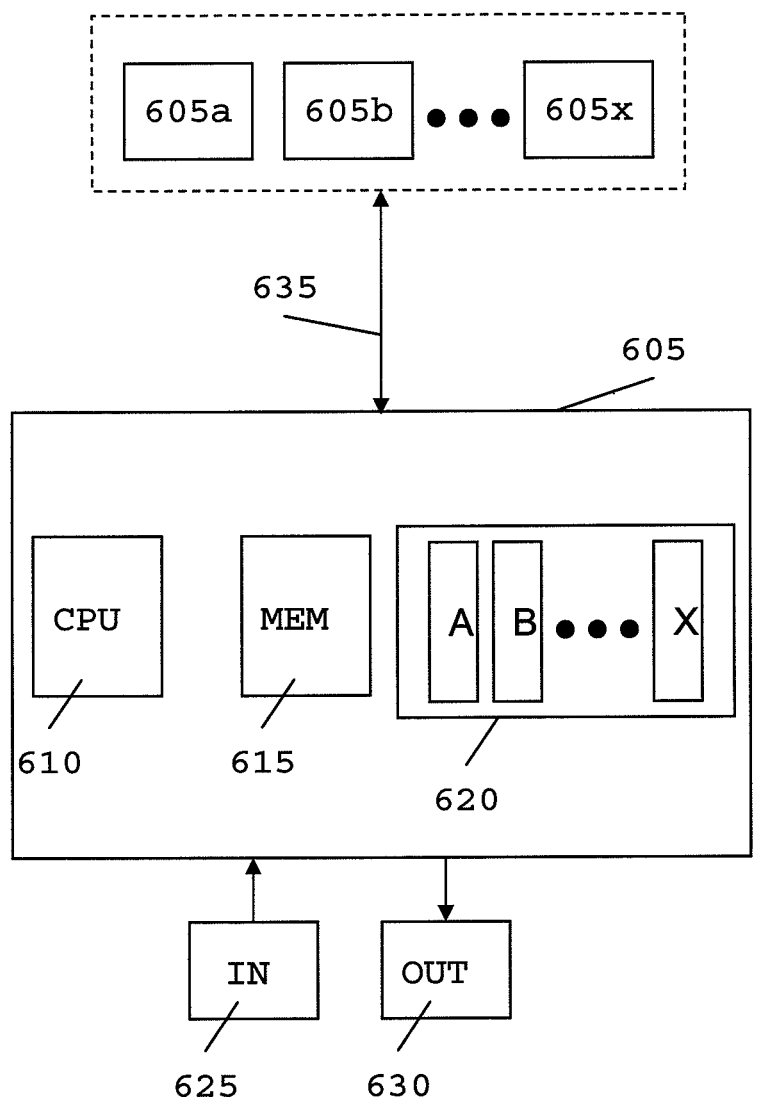
FIG. 6 is a block diagram that illustrates a computer in which an exemplary embodiment of the present invention may be implemented.

As shown in FIG. 6, a computer 605, which may be a laptop computer or server, includes a central processing unit (CPU) 610, a memory 615 and a module set 620 that includes program code for executing methods in accordance with exemplary embodiments of the present invention. The computer 605 is also coupled to input and output devices 625 and 630 and other computers 605a, b . . . x via a network 635.

The memory 615 includes random access memory (RAM) and read only memory (ROM). The memory 615 can also include a database, disk drive, tape drive or a combination thereof. The input 625 is constituted by a keyboard or mouse and the output 630 is constituted by a display or printer. The network 635 may be the Internet, for example.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for service invocation, comprising:
receiving a first request for a service to be invoked in an execution environment, wherein the first request only includes a semantic description of the service;
creating a processing graph for the first request from planning domain descriptions of a plurality of services;
deploying the processing graph in the execution environment as a composite service;
invoking the composite service in the execution environment; and
returning a response provided by the invoked composite service.

2. The method of claim 1, wherein the semantic description of the service includes a set of tags that describe the service.

3. The method of claim 1, wherein the service is a web service.

4. The method of claim 1, wherein the composite service is invoked with a parameter extracted from the first request.

5. The method of claim 1, further comprising:
storing the first request and information required to execute the deployed processing graph.

6. The method of claim 5, further comprising:
receiving a second request for a service to be invoked in the execution environment, wherein the second request includes a semantic description of the service; and
determining if the second request is the same as the stored first request, wherein if the first and second requests are the same:
re-invoking the composite service in the execution environment with a parameter extracted from the first request; and
returning an updated response provided by the invoked composite service.

7. The method of claim 5, further comprising:
receiving a second request for a service to be invoked in the execution environment, wherein the second request includes a semantic description of the service; and
determining if the second request is the same as the stored first request, wherein if the first and second requests are the same:
determining if the planning domain descriptions have changed after the stored first request has been processed, wherein if the planning domain descriptions have not been changed:
re-invoking the composite service in the execution environment; and
returning an updated response provided by the invoked composite service.

8. The method of claim 7, wherein the composite service is re-invoked with a parameter extracted from the second request.

9. The method of claim 5, further comprising:
receiving a second request for a service to be invoked in the execution environment, wherein the second request includes a semantic description of the service; and
determining if the second request is the same as the stored first request, wherein if the first and second requests are the same:
determining if the planning domain descriptions have changed after the stored first request has been processed, wherein if the planning domain descriptions have been changed:
creating a processing graph for the second request from the changed planning domain descriptions;
deploying the processing graph for the second request in the execution environment as a new composite service;
invoking the new composite service in the execution environment; and
returning a response provided by the newly invoked composite service.

10. The method of claim 9, wherein the new composite service is invoked with a parameter extracted from the second request.

11. A system for service invocation, comprising:
a memory device for storing a program;
a processor in communication with the memory device, the processor operative with the program to:
receive a first request for a service to be invoked in an execution environment, wherein the first request only includes a semantic description of the service;

create a processing graph for the first request from planning domain descriptions of a plurality of services;

deploy the processing graph in the execution environment as a composite service;

invoke the composite service in the execution environment; and return a response provided by the invoked composite service.

12. The system of claim 11, wherein the semantic description of the service includes a set of tags that describe the service.

13. The system of claim 11, wherein the service is a web service.

14. The system of claim 11, wherein the processor is further operative with the program to:

store the first request and information required to execute the deployed processing graph.

15. The system of claim 14, wherein the processor is further operative with the program to:

receive a second request for a service to be invoked in the execution environment, wherein the second request includes a semantic description of the service; and determine if the second request is the same as the stored first request, wherein if the first and second requests are the same:

re-invoke the composite service in the execution environment with a parameter extracted from the first request; and return an updated response provided by the invoked composite service.

16. The system of claim 14, wherein the processor is further operative with the program to:

receive a second request for a service to be invoked in the execution environment, wherein the second request includes a semantic description of the service; and determine if the second request is the same as the stored first request, wherein if the first and second requests are the same:

determine if the planning domain descriptions have changed after the stored first request has been processed, wherein if the planning domain descriptions have not been changed:

re-invoke the composite service in the execution environment; and return an updated response provided by the invoked composite service.

17. The system of claim 14, wherein the processor is further operative with the program to:

receive a second request for a service to be invoked in the execution environment, wherein the second request includes a semantic description of the service; and determine if the second request is the same as the stored first request, wherein if the first and second requests are the same:

determine if the planning domain descriptions have changed after the stored first request has been processed, wherein if the planning domain descriptions have been changed:

create a processing graph for the second request from the changed planning domain descriptions;

deploy the processing graph for the second request in the execution environment as a new composite service;

invoke the new composite service in the execution environment; and return a response provided by the newly invoked composite service.

18. A computer readable storage medium storing instructions that, when executed by a computer, cause the computer to perform a method for service invocation, the method comprising:

receiving a first request for a service to be invoked in an execution environment, wherein the first request only includes a semantic description of the service;

creating a processing graph for the first request from planning domain descriptions of a plurality of services;

deploying the processing graph in the execution environment as a composite service;

invoking the composite service in the execution environment; and returning a response provided by the invoked composite service.

19. The computer readable storage medium of claim 18, wherein the semantic description of the service includes a set of tags that describe the service.

20. The computer readable storage medium of claim 18, wherein the service is a web service.

21. The computer readable storage medium of claim 18, the method further comprising:

storing the first request and information required to execute the deployed processing graph.

22. The computer readable storage medium of claim 21, the method further comprising:

receiving a second request for a service to be invoked in the execution environment, wherein the second request includes a semantic description of the service; and determining if the second request is the same as the stored first request, wherein if the first and second requests are the same:

re-invoking the composite service in the execution environment with a parameter extracted from the first request; and returning an updated response provided by the invoked composite service.

23. The computer readable storage medium of claim 21, the method further comprising:

receiving a second request for a service to be invoked in the execution environment, wherein the second request includes a semantic description of the service; and determining if the second request is the same as the stored first request, wherein if the first and second requests are the same:

determining if the planning domain descriptions have changed after the stored first request has been processed, wherein if the planning domain descriptions have not been changed:

re-invoking the composite service in the execution environment; and returning an updated response provided by the invoked composite service.

24. The computer readable storage medium of claim 21, the method further comprising:

receiving a second request for a service to be invoked in the execution environment, wherein the second request includes a semantic description of the service; and determining if the second request is the same as the stored first request, wherein if the first and second requests are the same:

determining if the planning domain descriptions have changed after the stored first request has been processed, wherein if the planning domain descriptions have been changed:

creating a processing graph for the second request from the changed planning domain descriptions;

deploying the processing graph for the second request in the execution environment as a new composite service;

invoking the new composite service in the execution environment; and returning a response provided by the newly invoked composite service.

25. A method for web service invocation, comprising:

receiving a web service invocation request from a client, wherein the request only includes a set of tags that explicitly describe functions to be performed by the web service;

translating the request into a processing goal and composing a processing graph that satisfies the processing goal;

deploying the processing graph in an execution environment as a composite web service;

invoking the composite web service in the execution environment; and returning a response provided by the invoked composite web service to the client.

* * * * *